US010865758B2

(12) United States Patent
Takayama et al.

(10) Patent No.: US 10,865,758 B2
(45) Date of Patent: Dec. 15, 2020

(54) ENGINE START CONTROL DEVICE

(71) Applicant: HONDA MOTOR CO., LTD., Tokyo (JP)

(72) Inventors: Keishi Takayama, Wako (JP); Hiroshi Kurata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/495,707

(22) PCT Filed: Mar. 24, 2017

(86) PCT No.: PCT/JP2017/012165
§ 371 (c)(1),
(2) Date: Sep. 19, 2019

(87) PCT Pub. No.: WO2018/173291
PCT Pub. Date: Sep. 27, 2018

(65) Prior Publication Data
US 2020/0056574 A1 Feb. 20, 2020

(51) Int. Cl.
*F02N 11/04* (2006.01)
*F02N 11/08* (2006.01)
(52) U.S. Cl.
CPC .......... *F02N 11/04* (2013.01); *F02N 11/0818* (2013.01); *F02N 11/0862* (2013.01);
(Continued)
(58) Field of Classification Search
CPC .. F01N 11/04; F01N 11/0814; F01N 11/0818; F01N 11/0822; F01N 11/0833;
(Continued)

(56) References Cited

U.S. PATENT DOCUMENTS 7,000,998 B2* 2/2006 Hano ................ B60T 7/122
188/DIG. 2
2014/0066255 A1* 3/2014 Yu ................... F02N 11/0837
477/203
(Continued)

FOREIGN PATENT DOCUMENTS

JP 62-23829 A 1/1987
JP 2006-131121 A 5/2006
(Continued)

OTHER PUBLICATIONS

International Search Report, issued in PCT/JP2017/012165, PCT/ISA/210, dated May 30, 2017.
(Continued)

*Primary Examiner* — George C Jin
(74) *Attorney, Agent, or Firm* — Birch, Stewart, Kolasch & Birch LLP

(57) ABSTRACT

An engine start control device for vehicles is capable of preventing a shortage of electric power when an engine is restarted. A controller restarts an engine if an executing condition for a hill start assist control process is satisfied while the engine is being temporarily stopped according to an idling stop control process. Braking forces according to the hill start assist control process are kept by a brake oil pressure module that is energized when supplied with electric power. Restarting conditions include a plurality of ordinary restarting conditions and a particular restarting condition by way of the executing condition for the hill start assist control process. A second predetermined time after the particular restarting condition is satisfied until the ACG starter motor is energized is longer than a predetermined time after the ordinary restarting conditions are satisfied until the ACG starter motor is supplied with electric power.

15 Claims, 11 Drawing Sheets

(52) U.S. Cl.
CPC .. *F02N 2200/042* (2013.01); *F02N 2200/044* (2013.01); *F02N 2200/061* (2013.01)

(58) Field of Classification Search
CPC ............. F02N 11/0818; F02N 11/0862; F02N 2200/042; F02N 2200/044; F02N 2200/061
See application file for complete search history.

(56) References Cited

U.S. PATENT DOCUMENTS

2017/0113693 A1* 4/2017 Bularz .................. B60W 10/06
2018/0347530 A1* 12/2018 Le ........................... B60T 17/22

FOREIGN PATENT DOCUMENTS

| JP | 2011-1028 A | 1/2011 |
| JP | 2015-183644 A | 10/2015 |

OTHER PUBLICATIONS

International Preliminary Report on Patentability and Written Opinion of the International Searching Authority dated Oct. 3, 2019, for International Application No. PCT/JP2017/012165, with an English Translation.

* cited by examiner

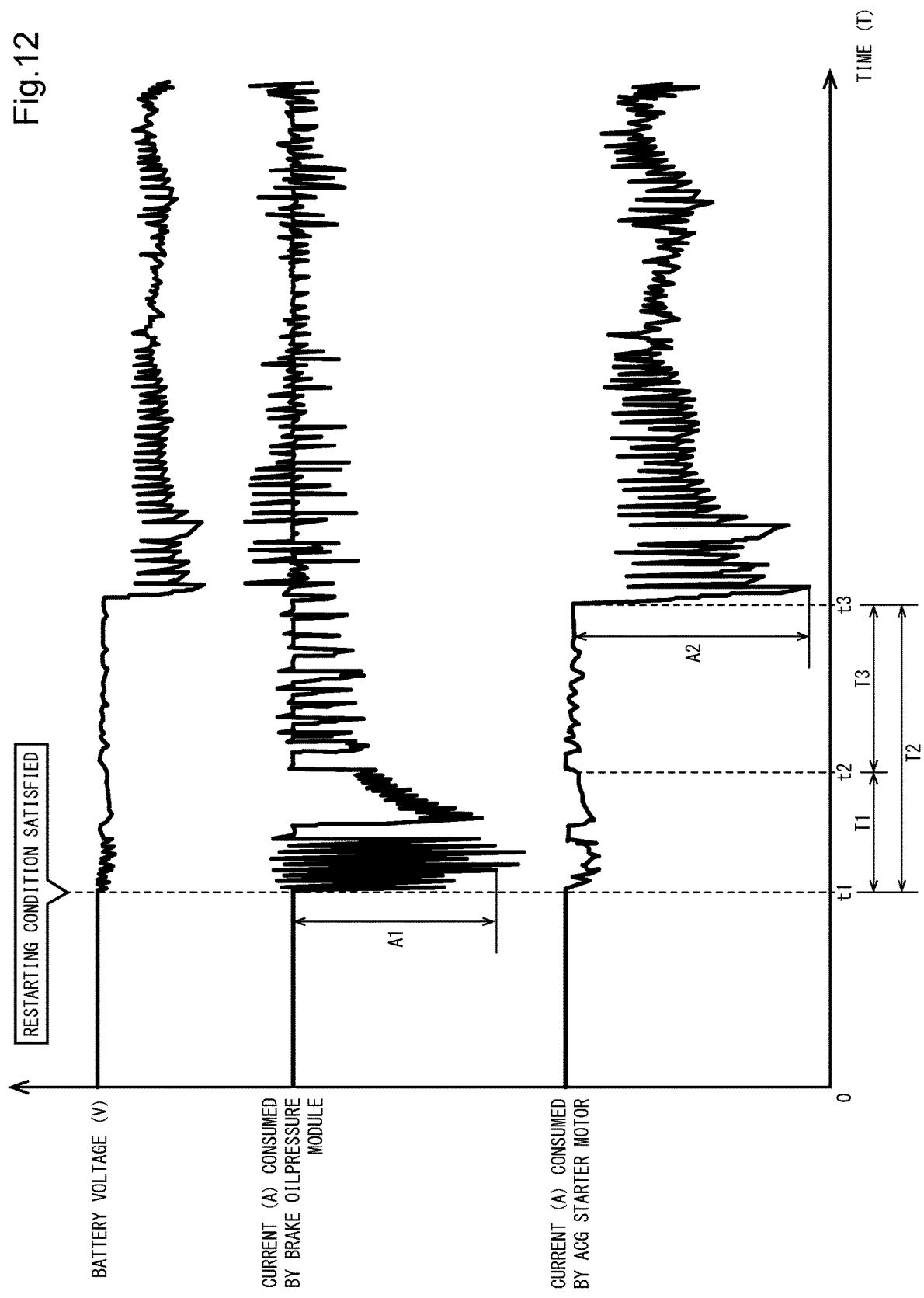

ENGINE START CONTROL DEVICE

TECHNICAL FIELD

The present invention relates to an engine start control device, and more particularly to an engine start control device having an idling stopping function and a hill start assisting function.

BACKGROUND ART

Heretofore, there has been known an idling stopping system (hereinafter referred to as "IS system") that automatically stops an engine when the vehicle powered by the engine comes to a temporary stop to wait for a traffic light, for example, and also automatically restarts the engine in response to an operation to start the vehicle. There has also been well known a hill start assisting system (hereinafter referred to as "HSA system") that, when a vehicle starts uphill from a stop on an uphill slope, keeps vehicle braking forces applied for a predetermined period of time even if the brake operating member is released to prevent the vehicle from creeping down.

Patent Document 1 discloses an engine start control device on a vehicle that incorporates the IS system and the HSA system therein, in which when the vehicle restarts from a state where an engine stop control process has been carried out on account of a stop on an uphill slope, the engine start control device supplies electric power to the HSA system from a backup power supply separate from a main battery on the vehicle. The disclosed arrangement avoids a power shortage that would otherwise tend to occur in the HSA system due to the consumption of large electric power by a starter motor on the vehicle, thereby preventing the HSA system from undergoing system resetting.

CITATION LIST

Patent Literature

Patent Document 1: JP 2011-1028 A

SUMMARY OF INVENTION

Technical Problem

Audio devices and navigation devices installed as comfort equipment on vehicles act as electric power loads that would bring about system resetting to be avoided when the engine is restarted. Vehicles that incorporate both the IS system and the HSA system should desirably avoid the installation of backup power supplies that require an installation space and invite an increase in the cost of parts used.

The technology disclosed in Patent Document 1 attempts to eliminate, with the backup power supply, a power shortage that would otherwise tend to occur in the HSA system when the engine is restarted. Nothing is considered in the disclosed technology about preventing other electric power loads from suffering a power shortage without using a backup power supply.

It is an object of the present invention to provide an engine start control device for vehicles which will solve the above problems of the background art and is of a simple arrangement capable of preventing a shortage of electric power from occurring when an engine is restarted.

Solution to Problems

To achieve the afore-mentioned object, the present invention has a first feature in that an engine start control device applicable to a vehicle (1) has an alternating-current generator starter motor (40) for applying a starting torque to an engine (E) when supplied with electric power from a battery (58) and generating electric power based on rotational power from the engine (E), and a controller (150) for carrying out an idling stop control process and a hill start assist control process, wherein the idling stop control process is a control process for temporarily stopping the engine (E) if a stopping condition is satisfied and restarting the engine (E) if restarting conditions are satisfied, the hill start assist control process is a control process for keeping braking forces for a predetermined time even if a brake operating member (13, 36) is released while the vehicle is being stopped on an uphill slope, and the controller (150) restarts the engine (E) if an executing condition for the hill start assist control process is satisfied while the engine (E) is being temporarily stopped according to the idling stop control process.

To achieve the afore-mentioned object, the present invention has a second feature in that the braking forces according to the hill start assist control process are kept by a brake oil pressure module (95) that is energized when supplied with electric power, the restarting conditions for the idling stop control process includes a plurality of ordinary restarting conditions and a particular restarting condition by way of the executing condition for the hill start assist control process that is to be satisfied while the engine (E) is being temporarily stopped according to the idling stop control process, and the controller (150) makes a second predetermined time (T2) after the particular restarting condition is satisfied until the controller (150) starts to energize the alternating-current generator starter motor (40) longer than a predetermined time (T1) after the ordinary restarting conditions are satisfied until the controller (150) starts to energize the alternating-current generator starter motor (40).

To achieve the afore-mentioned object, the present invention has a third feature in that the ordinary restarting conditions include a condition in which a battery charge of the battery (58) is smaller than a predetermined value.

To achieve the afore-mentioned object, the present invention has a fourth feature in that the brake operating member (13, 36) includes a brake lever (13) mounted on a grip-type steering handle (5), and the executing condition for the hill start assist control process includes a condition in which the brake lever (13) is operated.

To achieve the afore-mentioned object, the present invention has a fifth feature in that the vehicle (1) has a throttle grip (5a) mounted on the steering handle (5) on the brake lever (13) side and a throttle grip opening sensor (33) for detecting an operated opening of the throttle grip (5a), and the ordinary restarting conditions include a condition in which an opening operation of the throttle grip (5a) is detected by the throttle grip opening sensor (33).

To achieve the afore-mentioned object, the present invention has a sixth feature in that the engine (E) has an automatic transmission (90), and the controller (150) controls the automatic transmission (90) to switch to a non-power transmitting state when restarting the engine (E).

To achieve the afore-mentioned object, the present invention has a seventh feature in that the vehicle (1) includes an electric power load using the single battery (58) as an electric power supply source.

Effects of Invention

According to the first feature of the present invention, an engine start control device applicable to a vehicle (1) has an alternating-current generator starter motor (40) for applying a starting torque to an engine (E) when supplied with electric power from a battery (58) and generating electric power based on rotational power from the engine (E), and a controller (150) for carrying out an idling stop control process and a hill start assist control process, wherein the idling stop control process is a control process for temporarily stopping the engine (E) if a stopping condition is satisfied and restarting the engine (E) if restarting conditions are satisfied, the hill start assist control process is a control process for keeping braking forces for a predetermined time even if a brake operating member (13, 36) is released while the vehicle is being stopped on an uphill slope, and the controller (150) restarts the engine (E) if an executing condition for the hill start assist control process is satisfied while the engine (E) is being temporarily stopped according to the idling stop control process. Therefore, since the engine is restarted to cause the alternating-current generator starter motor to generate electric power, it is possible to avoid a shortage of electric power for devices required to perform the hill start assist control process and other electric power loads including an audio device, a navigation device, and so on.

According to the second feature of the present invention, the braking forces according to the hill start assist control process are kept by a brake oil pressure module (95) that is energized when supplied with electric power, the restarting conditions for the idling stop control process includes a plurality of ordinary restarting conditions and a particular restarting condition by way of the executing condition for the hill start assist control process that is to be satisfied while the engine (E) is being temporarily stopped according to the idling stop control process, and the controller (150) makes a second predetermined time (T2) after the particular restarting condition is satisfied until the controller (150) starts to energize the alternating-current generator starter motor (40) longer than a predetermined time (T1) after the ordinary restarting conditions are satisfied until the controller (150) starts to energize the alternating-current generator starter motor (40). Therefore, for restarting the engine when the executing condition for the hill start assist control process is satisfied while the engine is being stopped according to the idling stop control process, the timing to start supplying electric power to the alternating-current generator starter motor is made later than if the engine is restarted ordinarily. The co-occurrence of the peak of electric power consumed by the brake oil pressure module and the peak of electric power consumed by the alternating-current generator starter motor at the time the hill start assist control process is started is avoided. A shortage of electric power supplied to the other electric power loads is avoided.

According to the third feature of the present invention, the ordinary restarting conditions include a condition in which a battery charge of the battery (58) is smaller than a predetermined value. Therefore, in a case where the battery charge of the battery runs low, the starting of the engine is prioritized to prevent the battery from running out of the stored electric energy in advance.

According to the fourth feature of the present invention, the brake operating member (13, 36) includes a brake lever (13) mounted on a grip-type steering handle (5), and the executing condition for the hill start assist control process includes a condition in which the brake lever (13) is operated. Therefore, it is possible to perform the hill start assist control process in a manner to reflect the will of the rider with certainty by including, as the executing condition for the hill start assist control process, the operation of the brake lever that is liable to detect the will of the rider to stop the vehicle more accurately than the brake pedal that is operated by foot.

According to the fifth feature of the present invention, the vehicle (1) has a throttle grip (5a) mounted on the steering handle (5) on the brake lever (13) side and a throttle grip opening sensor (33) for detecting an operated opening of the throttle grip (5a), and the ordinary restarting conditions include a condition in which an opening operation of the throttle grip (5a) is detected by the throttle grip opening sensor (33). Therefore, the throttle grip that is operated to satisfy one of the ordinary restarting conditions and the brake lever that is operated to satisfy the particular restarting condition are operated by the same hand. Accordingly, a plurality of operations for starting the engine are handled together by one hand, resulting in a reduction in the complexities of the operation sequences.

According to the sixth feature of the present invention, the engine (E) has an automatic transmission (90), and the controller (150) controls the automatic transmission (90) to switch to a non-power transmitting state when restarting the engine (E). Therefore, when the engine is restarted at the start of the hill start assist control process, it is possible to avoid having the transmission stay in a gear meshing state, thus preventing the vehicle from wobbling forwardly and rearwardly at the time the engine is cranked.

According to the seventh feature of the present invention, the vehicle (1) includes an electric power load using the single battery (58) as an electric power supply source. Therefore, even in a case where the battery power consumption tends to increase due to the idling stop control process and the hill start assist control process, the engine is restarted according to the hill start assist control process while the engine is being stopped from idling. Therefore, the single battery is able to cover all the electric energy consumed by the vehicle. As a result, the space available on the vehicle body, especially of a small-size vehicle where extra available space is limited, can effectively be used, and the weight of the vehicle is prevented from increasing.

BRIEF DESCRIPTION OF DRAWINGS

FIG. 12 is a timing chart illustrating the transition of a battery voltage at the time the engine is restarted.

DESCRIPTION OF EMBODIMENTS

Figure 1:
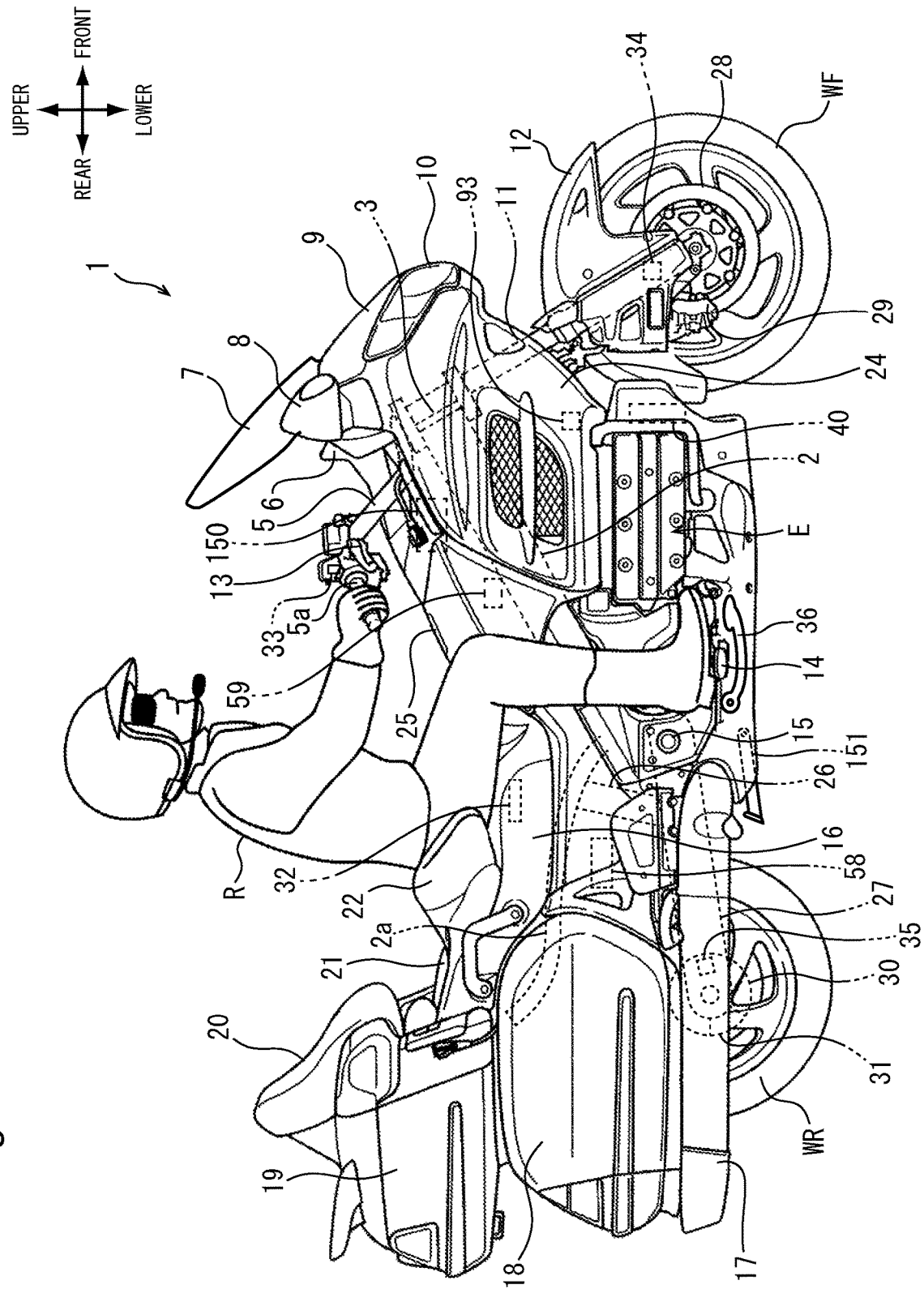
FIG. 1 is a right-hand side elevational view of a motorcycle incorporating an engine start control device according to the embodiment of the present invention.

A preferred embodiment of the present invention will hereinafter be described in detail below with reference to the drawings. FIG. 1 is a right-hand side elevational view of a motorcycle 1 incorporating an engine start control device according to the embodiment of the present invention. The motorcycle 1 is a saddle-type vehicle that incorporates, as a power source, a horizontally opposed 6-cylinder engine having a twin-clutch transmission, and includes a large-size cowling and a plurality of storage cases.

A head pipe 3 on which a steering stem, not illustrated, is rotatably supported is disposed on a front portion of a vehicle body frame 2. A front fork 11 with a pair of left and right legs on which a front wheel WF is rotatably supported is fixed to and steerably supported on the steering stem. The front fork 11 has an upper end on which there is mounted a steering handle 5 having a right-hand throttle grip 5a and a left-hand handle grip 5b (see FIGS. 2 and 3). A front fender 12 covering an upper portion of the front wheel WF is mounted substantially centrally on the front fork 11.

An engine E is suspended from and secured to respective lower portions of a pair of left and right main tubes that extend rearwardly and downwardly with respect to the vehicle body from the head pipe 3. An alternating-current generator (ACG) starter motor 40 is disposed on a front end of the engine E. The ACG starter motor 40 applies a starting torque to the engine E when supplied with electric power from a battery 58 and generates electric power when rotated by rotational power from the engine E. A coolant temperature sensor 93 for detecting the temperature of an engine coolant is disposed above the ACG starter motor 40.

A swing arm 27 is swingably supported by a pivot 15 disposed on a rear end of the vehicle body frame 2 behind the engine E. A rear frame 2a is disposed on the rear end of the vehicle body frame 2 and extends rearwardly and upwardly from above the pivot 15 to support a seat 16 and a pair of left and right pannier cases 18, etc. A pair of left and right steps 14 for placing the feet of a rider R thereon are attached to the vehicle body frame 2 forwardly and downwardly of the pivot 15.

The swing arm 27, on which a rear wheel WR as a drive wheel is rotatably supported, is suspended from the vehicle body by a rear cushion 26 connected to the rear frame 2a. Drive power from the engine E is transmitted by a drive shaft, not illustrated, extending through the swing arm 27 to the rear wheel WR. A combustion gas emitted from the engine E is discharged from the rear ends of a pair of left and right mufflers 17. The battery 58 for supplying electric power to electric power loads including an audio device, a navigation device, and so on, in addition to the ACG starter motor 40, is disposed behind the rear cushion 26.

The pair of left and right pannier cases 18 as storage boxes are mounted on the vehicle body above the mufflers 17. The seat 16 includes a waist pad 22 for the rider R to be seated on a front portion of the seat 16 and a seat area 21 for a passenger. A seat back 20 for the passenger is disposed on a front face of a top case 19 disposed as a storage box centrally with respect to the widthwise directions of the vehicle.

The head pipe 3 has its front area covered with a front cowl 9 having a headlight 10. The vehicle body frame 2 and the engine E have upper portions covered with a pair of side cowls 24 coupled to a rear portion of the front cowl 9. A pair of left and right rearview mirrors 8 with integral turn indicators are mounted on outer positions on the front cowl 9 with respect to the widthwise directions of the vehicle forwardly of the steering handle 5. A fuel tank has a fuel filler lid 25 disposed between the seat 16 and the steering handle 5. A windscreen 7 that is positionally adjustable in heightwise directions is disposed between the left and right rearview mirrors 8 in front of the rider R. An instrument panel 6 is disposed immediately behind the windscreen 7 centrally with respect to the widthwise directions of the vehicle. An electronic control unit (ECU) 150 as a controller is disposed in a position below the steering handle 5 within the cowl assembly. A hill-climb angle sensor 59 for detecting the angle of the vehicle body in pitching directions is disposed rearwardly and downwardly of the ECU 150.

The front wheel WF is combined with a hydraulic front wheel brake including a front brake disk 28 and a front brake caliper 29 for gripping the front brake disk 28 to produce vehicle braking forces. The rear wheel WR is combined with a hydraulic rear wheel brake including a rear brake disk 30 and a rear brake caliper 31. The front wheel brake is actuated by a brake lever 13 mounted on a right side of the steering handle 5 with respect to the widthwise directions of the vehicle. The rear wheel brake is actuated by a brake pedal 36 disposed below the step 14 mounted on a right side of the vehicle body with respect to the widthwise directions of the vehicle.

A throttle grip opening sensor 33 for detecting an angular displacement of the throttle grip 5a is incorporated in the base of the throttle grip 5a which is rotatably supported on the right side of the steering handle 5 with respect to the widthwise directions of the vehicle. A front wheel rotational speed sensor 34 is disposed on the front fork 11 in the vicinity of a lower end portion thereof. A rear wheel rotational speed sensor 35 is disposed on the swing arm 27 in the vicinity of a rear end portion thereof. The seat 16 houses therein a seat switch 32 for detecting a seated state of the rider R. A side stand 151 is mounted on a lower portion of the vehicle body.

Figure 2:
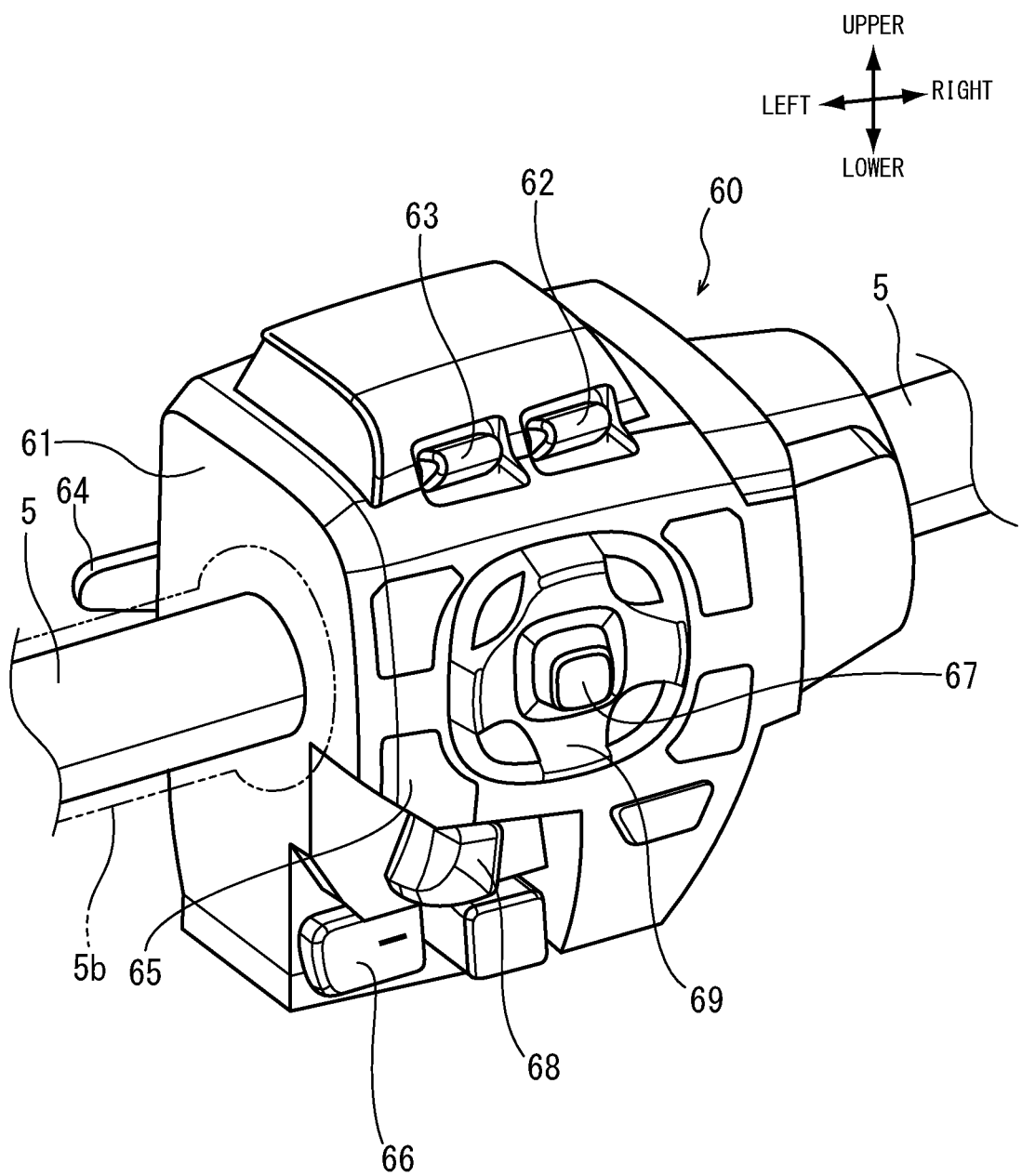
FIG. 2 is a perspective view of a left handle switch.

FIG. 2 is a perspective view of a left handle switch 60 mounted on a left side of the steering handle 5 with respect to the widthwise directions of the vehicle. The handle switch 60 has a housing 61 disposed adjacent to an inner side of the handle grip 5b with respect to the widthwise directions of the vehicle. The housing 61 of the handle switch 60 supports thereon, a volume switch 62, a screen height adjusting switch 63, a horn switch 65, a turn indicator switch 68, and a shift-up switch 64 and a shift-down switch 66 for making gear changes in the transmission, in addition to a cross button 69 and a select button 67 that are used to operate the navigation device, etc. . . . . .

The horn switch 65, which is of the press type, is disposed at substantially the same height as the steering handle 5. The volume switch 62 and the screen height adjusting switch 63, which are of the vertically swingable type, are juxtaposed in left and right positions above the cross button 69. The turn indicator switch 68 that operates a directional indicator when tilted to the left or right is disposed in a recess below the horn switch 65.

Figure 3:
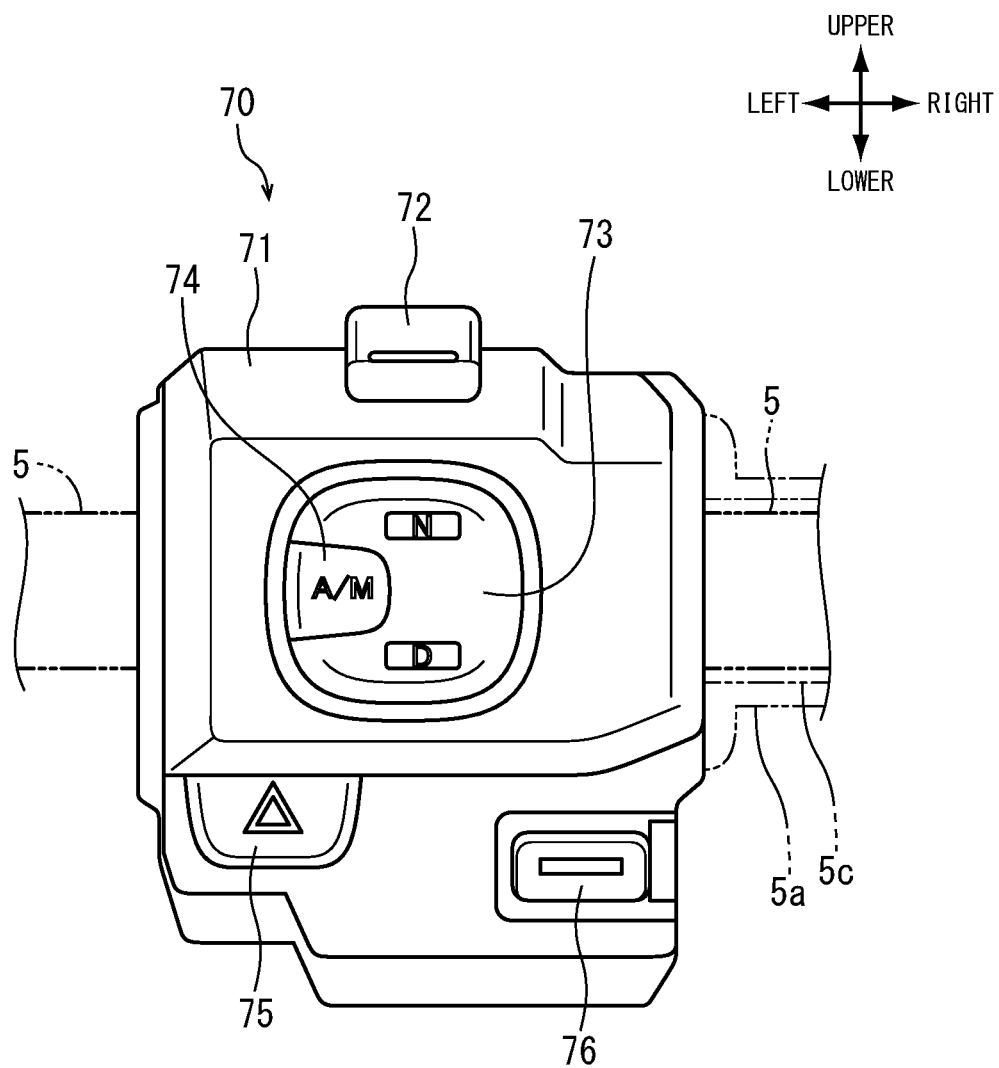
FIG. 3 is a front elevational view of a right handle switch.

FIG. 3 is a front elevational view of a right handle switch 70 mounted on a right side of the steering handle 5 with respect to the widthwise directions of the vehicle. The throttle grip 5a covers a throttle pipe 5c angularly movably fitted over the steering handle 5. The right handle switch 70 has a housing 71 disposed adjacent to an inner side of the throttle grip 5a with respect to the widthwise directions of the vehicle. The housing 71 supports thereon an engine stop switch 72, a neutral-drive (N-D) selector switch 73, an automatic/manual selector switch 74, a hazard lamp switch 75, and a starter switch 76 that doubles as an IS mode selector switch for selecting the execution/non-execution of an idling stop control process. The IS mode selector switch/starter switch 76 is able to switch between the execution and the non-execution of the idling stop control process each time it is pressed after the engine has been started by operating the switch. While the engine is being stopped, the cross button 69 and the select button 67 can also switch between the execution and the non-execution of the idling stop control process in an idling stop control switching mode displayed on a display device, not illustrated.

The N-D selector switch 73, which is of the vertically swingable type, selects an N gear mode or a D gear mode, i.e., switches between a neutral state (N) of the transmission and a drive (D) mode in which the transmission and the clutch device are automatically controlled based on a vehicle speed and an engine rotational speed. The automatic/manual selector switch 74, which is of the press type, switches between an automatic mode in which the transmission automatically makes gear changes and a manual mode in which the transmission makes gear changes in response to an operation of the shift-up switch 64 and the shift-down switch 66, while the vehicle is travelling in the D mode.

Figure 4:
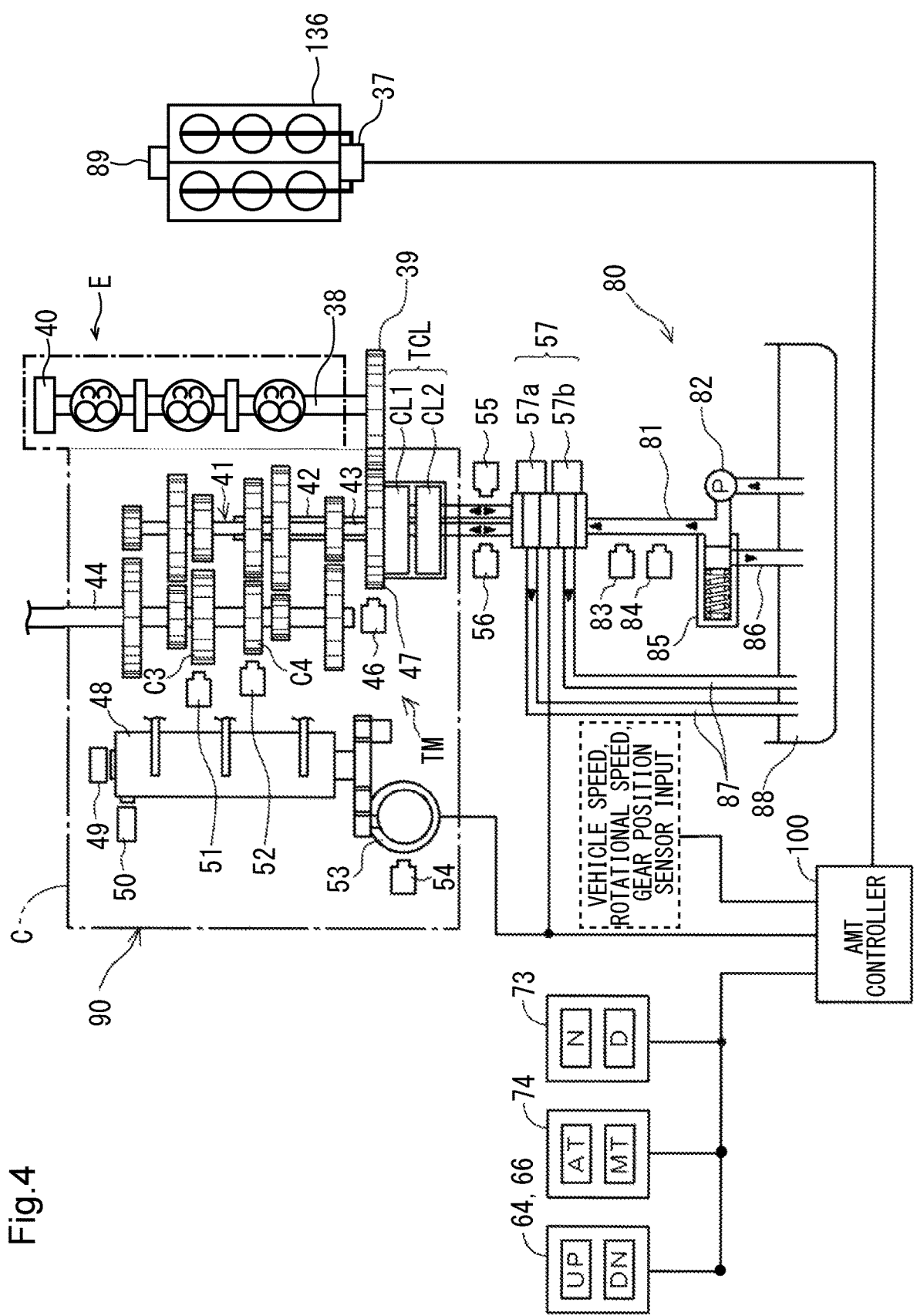
FIG. 4 is a system makeup diagram of an AMT and its peripheral devices.

FIG. 4 is a system makeup diagram of an automatic manual transmission (hereinafter referred to as "AMT") 90 as an automatic transmission and its peripheral devices. The AMT 90 is constructed as a twin-clutch transmission device for selectively transmitting and interrupting rotational drive power from the engine with a twin clutch TCL including two clutches CL1 and CL2 disposed on a main shaft. The AMT 90 that is housed in a crankcase C is actuated and controlled by a clutch oil pressure device 80 and an AMT controller 100. The AMT controller 100 is included in the ECU 150 and includes clutch control means for actuating and controlling a valve 57. The engine E has a throttle-by-wire throttle body 136 that includes a motor 37 for opening and closing throttle valves.

The AMT 90 includes a forward-6-stage transmission TM, the twin clutch TCL including the first and second clutches CL1 and CL2, a shift drum 48, and a shift control motor 53 for angularly moving the shift drum 48. The transmission TM includes a number of gears coupled to or loosely fitted over the main shaft 41 and a countershaft 44. The main shaft 41 includes an inner main shaft 43 and an outer main shaft 42. The inner main shaft 43 is coupled to the first clutch CL1, and the outer main shaft 42 is coupled to the second clutch CL2. Transmission gears that are axially displaceable are mounted on the main shaft 41 and the countershaft 44. A gear position is selected depending on an angular displacement of the shift drum 48.

The engine E has a crankshaft 38 coupled to a primary drive gear 39 that is held in mesh with a primary driven gear 47. The primary driven gear 47 is coupled to the inner main shaft 43 through the first clutch CL1 and coupled to the outer main shaft 42 through the second clutch CL2. The ACG starter motor 40 that functions as a starter motor and a generator is fixed to the other end of the crankshaft 38.

The AMT 90 includes an inner main shaft rotational speed sensor 51 and an outer main shaft rotational speed sensor 52 for detecting the rotational speeds of the inner main shaft 43 and the outer main shaft 42, respectively, by measuring the rotational speeds of predetermined transmission gears on the countershaft 44. The inner main shaft rotational speed sensor 51 measures the rotational speed of a driven transmission gear C3 that is held in mesh with a transmission gear non-rotatably mounted on the inner main shaft 43 and that is rotatably and non-slidably mounted on the countershaft 44. The outer main shaft rotational speed sensor 52 measures the rotational speed of a driven transmission gear C4 that is held in mesh with a transmission gear non-rotatably mounted on the outer main shaft 42 and that is rotatably and non-slidably mounted on the countershaft 44. Rotational power of the countershaft 44 is transmitted to the rear wheel WR through the drive shaft.

The AMT 90 also includes an engine rotational speed sensor 46 disposed in facing relation to the outer circumference of the primary driven gear 47, a gear position sensor 49 for detecting a gear position of the transmission TM based on an angular position of the shift drum 48, a shifter sensor 54 for detecting an angular position of a shifter that is actuated by the shift control motor 53, and a neutral switch 50 for detecting when the shift drum 48 is in a neutral position. A throttle valve opening sensor 89 for detecting openings of the throttle valves is mounted on the throttle body 36.

The clutch oil pressure device 80 uses oil that doubles as both lubricating oil for the engine E and working oil for actuating the twin clutch. The clutch oil pressure device 80 has an oil tank 88 and a pipe 81 for supplying oil from the oil tank 88 to the first clutch CL1 and the second clutch CL2. The pipe 81 is connected to an oil pressure pump 82 as an oil pressure supply source and a valve, i.e., a solenoid-controlled valve, 57 as an actuator. A regulator 85 for keeping an oil pressure supplied to the valve 57 at a constant value is connected to a return pipe 86 coupled to the pipe 81. The valve 57 includes a first valve 57a and a second valve 57b that are capable of applying oil pressures individually to the first clutch CL1 and the second clutch CL2. The first valve 57a and the second valve 57b are connected respectively to oil return pipes 87.

The first valve 57a and the first clutch CL1 are interconnected by a pipe combined with a first oil pressure sensor 55 that measures an oil pressure applied to the first clutch CL1. Similarly, the second valve 57b and the second clutch CL2 are interconnected by a pipe combined with a second oil pressure sensor 56 that measures an oil pressure applied to the second clutch CL2. Furthermore, the pipe 81 that interconnects the oil pressure pump 82 and the valve 57 is combined with a main oil pressure sensor 83 and an oil temperature sensor 84 as oil temperature detecting means.

The automatic/manual selector switch 74, the shift-up switch 64 and the shift-down switch 66, and the N-D selector switch 73 are connected to the AMT controller 100. The AMT controller 100 controls the valve 57 and the shift control motor 53 in response to output signals from the sensors and switches referred to above, for thereby automatically or semi-automatically changing gear positions of the AMT 90. Specifically, when the automatic mode is selected, gear positions are automatically changed depending on information representing the vehicle speed, the engine rotational speed, the throttle valve openings, etc. When the manual mode is selected, gear positions are changed in response to operation of the shift-up switch 64 and the shift-down switch 66.

Figure 5:
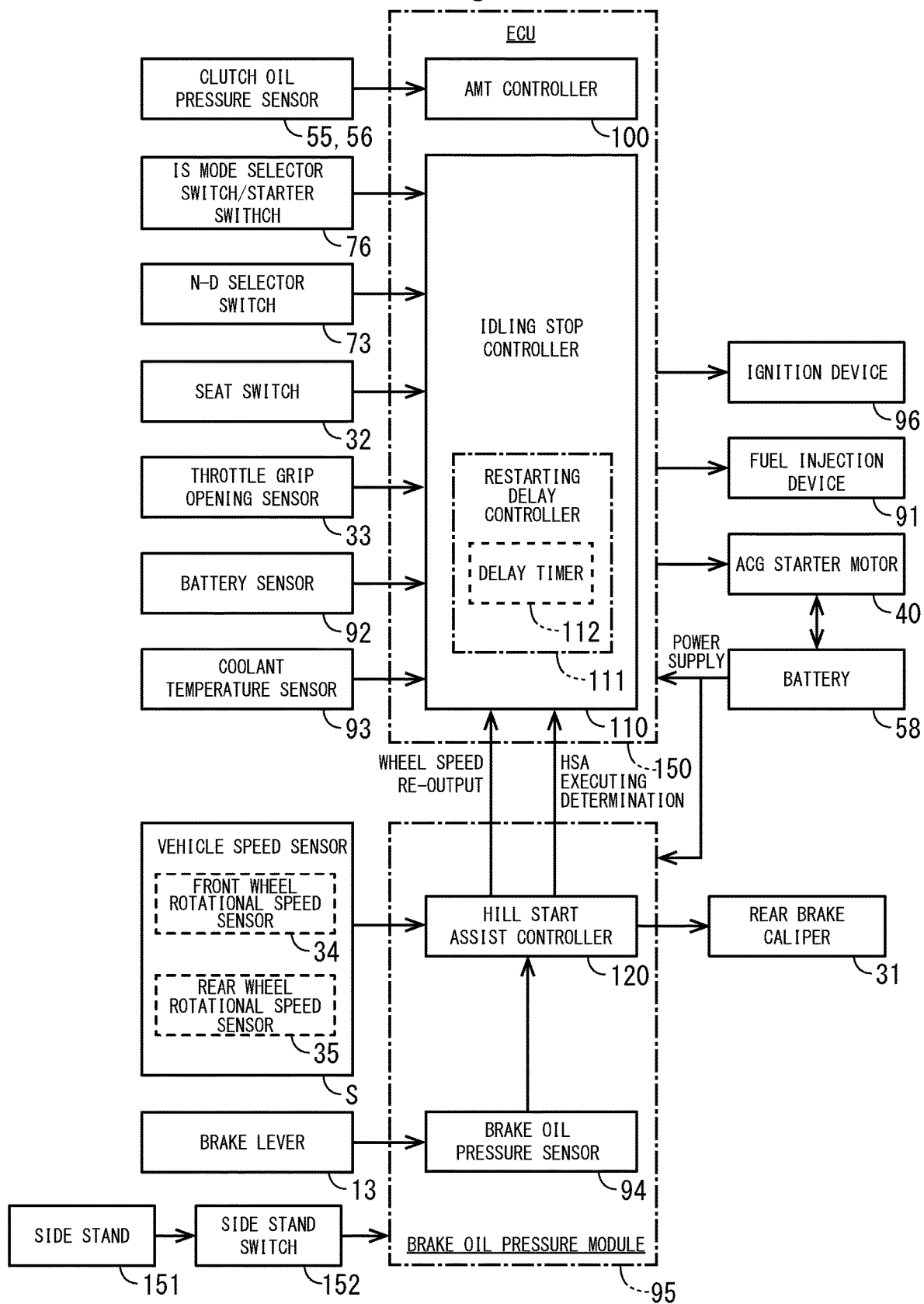
FIG. 5 is a block diagram representing the makeup of an ECU and its peripheral devices.

FIG. 5 is a block diagram representing the makeup of the ECU 150 and its peripheral devices. The ECU 150 as the controller includes an idling stop controller 110 for performing the idling stop (IS) control process, in addition to the AMT controller 100 described above. A brake oil pressure module 95 includes a hill start assist controller 120 for performing a hill start assist (HSA) control process. The IS control process according to the present embodiment is a control process for temporarily stopping the engine E if a certain executing condition is satisfied and restarting the engine E if a certain restarting condition is satisfied. The HSA control process according to the present embodiment is a control process for keeping rear wheel braking forces applied to prevent the vehicle from creeping down for a predetermined period of time even if the brake lever 13 and the brake pedal 36 are released.

The AMT controller 100 is supplied with output signals from the clutch oil pressure sensors 55 and 56. The idling stop controller 110 is supplied with output signals from the IS mode selector switch/starter switch 76, the N-D selector switch 73, the seat switch 32, the throttle grip opening sensor 33, a battery sensor 92 for detecting the voltage of the battery 58, and the coolant temperature sensor 93. The idling stop controller 110 actuates and controls an ignition device 96, a fuel injection device 91, and the ACG starter motor 40 of the engine E based on sensor signals from these sensors.

The hill start assist controller 120 is supplied with output signals from a vehicle speed sensor S including the front wheel rotational speed sensor 34 and the rear wheel rotational speed sensor 35 and a brake oil pressure sensor 94 for detecting an oil pressure change caused when the brake lever 13 is operated. The brake oil pressure module 95 is supplied with an output signal from a side stand switch 152 that detects whether the side stand 151 is stored or not. Based on these sensor signals, the hill start assist controller 120 actuates and controls the brake oil pressure supplied to the rear brake caliper 31. Further, the hill start assist controller 120 outputs wheel speeds again and also outputs information as to whether the HSA control process is to be carried out or not to the idling stop controller 110.

The brake oil pressure module 95 may be arranged to supply brake oil pressure to both of the front and rear wheel brakes. The brake system may also be arranged as a front and rear interlink system for generating braking forces for only the front wheel WF when the brake lever 13 is operated and generating braking forces for both the front wheel WF and the rear wheel WR when the brake pedal 36 is operated.

The ACG starter motor 40 and the brake oil pressure module 95 are energized by electric power supplied from the battery 58. The battery 58 supplies electric power to the electric power loads including the audio device, the navigation device, and so on, in addition to the AMT controller 100 described above and is charged with electric power generated by the ACG starter motor 40 while the engine E is in operation.

The idling stop controller 110 according to the present embodiment has a restarting delay controller 111 including a delay timer 112. The restarting delay controller 111 is capable of delaying a timing to energize the ACG starter motor 40 when a particular restarting condition is satisfied. Specifically, there are a plurality of restarting conditions set for restarting the engine from a temporarily stopped state according to the IS control process. The restarting delay controller 111 delays the timing to energize the ACG starter motor 40 from a normal engine restarting timing only when a particular restarting condition that "an executing condition for the HSA control process is satisfied while in the temporarily stopped state" is satisfied.

Executing conditions for the IS control process and the HSA control process and the relation between the control processes including a restarting delay control process will hereinafter be described below with reference to flowcharts illustrated in FIGS. 6 through 11.

Figure 6:
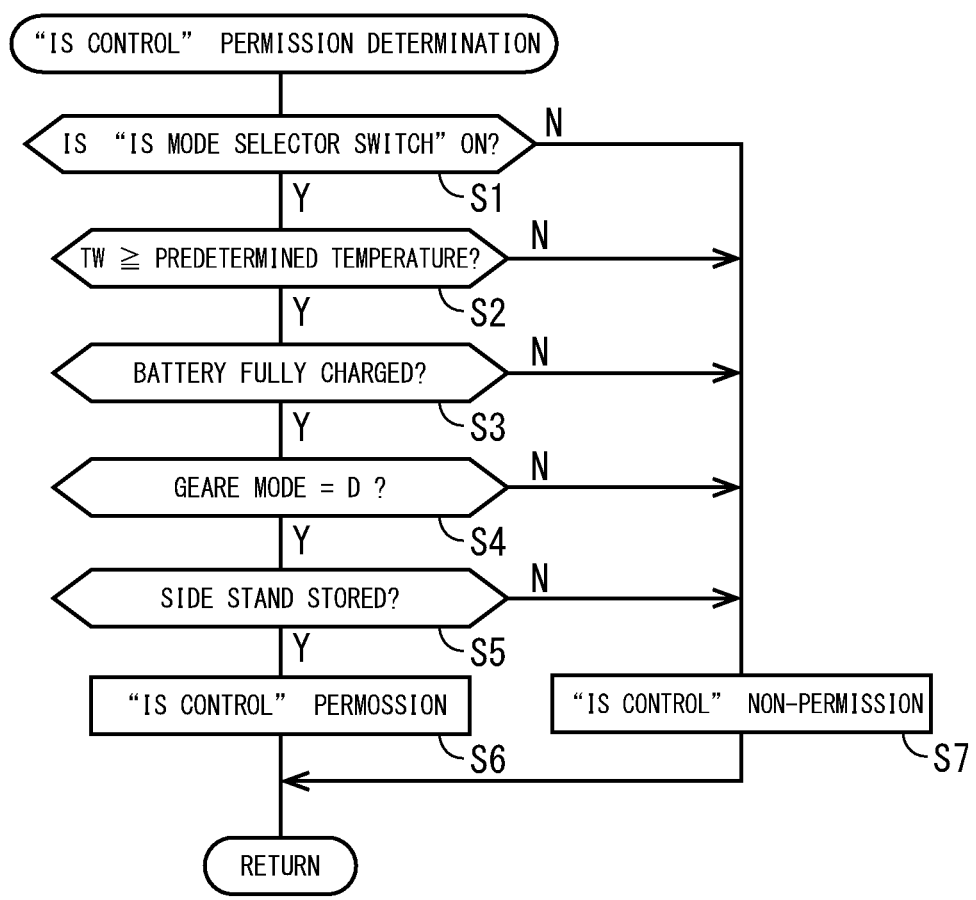
FIG. 6 is a flowchart of a processing sequence for determining whether an IS control process is permitted or not.

FIG. 6 is a flowchart of a processing sequence for determining whether the IS control process is permitted or not. The processing sequence determines preconditions as to whether or not the vehicle is in a state suitable for the IS control process. In step S1, it is determined whether the IS mode selector switch/starter switch 76 is on or not, i.e., whether the idling stop controller 110 is in an execution mode for the IS control process or not. If the answer to step S1 is affirmative, then control goes to step S2. In step S2, it is determined whether or not the coolant temperature TW of the engine coolant that is detected by the coolant temperature sensor 93 is equal to or higher than a predetermined temperature, e.g., 60° C. If the answer to step S2 is affirmative, i.e., if the engine E has been warmed up to make the vehicle ready to restart, then control goes to step S3, which determines whether or not the voltage of the battery 58 that is detected by the battery sensor 92 is equal to or higher than a predetermined value, i.e., whether the battery 58 has been charged or not.

If the answer to step S3 is affirmative, i.e., if the battery charge is enough to restart the vehicle, then control goes to step S4, which determines whether a gear mode selected by the N-D selector switch 73 is the D mode or not. If the answer to step S4 is affirmative, then control goes to step S5, which determines whether the side stand 151 is in a stored state or not. If the answer to step S5 is affirmative, then it is determined in step S6 that the IS control process can be executed, and the IS control process is permitted, after which the processing sequence is ended. If the answer to any of steps S1 through S5 is negative, then control goes to step S7, which determines that the IS control process is not permitted, after which the processing sequence is ended.

Figure 7:
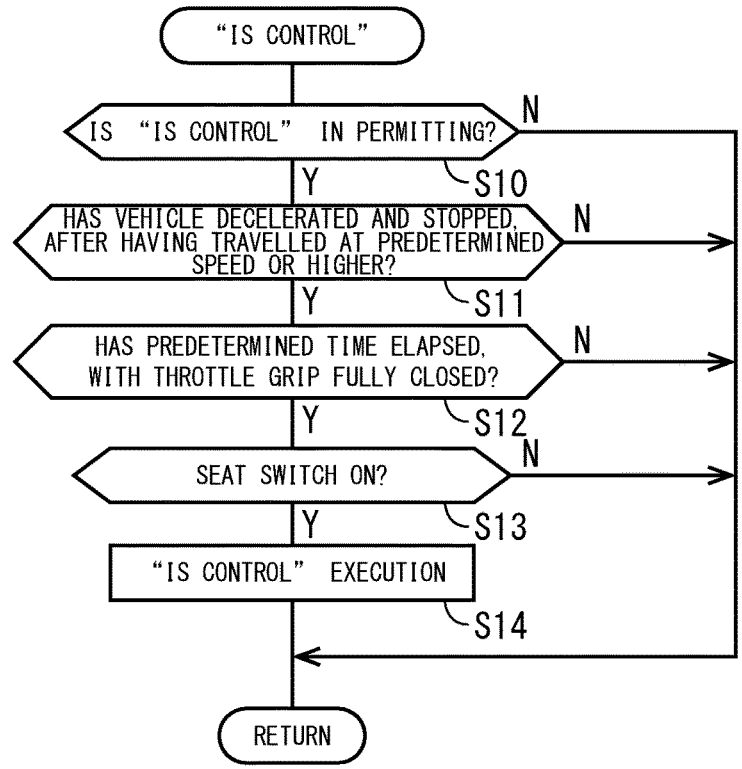
FIG. 7 is a flowchart of a processing sequence of the IS control process.

FIG. 7 is a flowchart of a processing sequence of the IS control process. In step S10, it is determined whether the IS control process has been determined as permitted or not. If the answer to step S10 is affirmative, then control goes to step S11. In step S11, it is determined whether the vehicle has been decelerated and stopped after having travelled at a predetermined vehicle speed, e.g., 10 km/h, or higher. This determining step is carried out to prevent the IS control process from being performed frequently, increasing the battery load in a traffic jam where the vehicle repeatedly stops and creeps. The vehicle may be determined as stopped if 1 second has elapsed after the higher one of the speeds of the front and rear wheels reached 3 km/h or lower, for example.

If the answer to step S11 is affirmative, then control goes to step S12, which determines whether a predetermined time, e.g., 1.5 seconds, has elapsed with the throttle grip 5a fully closed or not. If the answer to step S12 is affirmative, then control goes to step S13, which determines whether the seat switch 32 is on or not. If the answer to step S13 is affirmative, i.e., if the rider R is determined as seated, then control goes to step S14, which carries out the IS control process. In the IS control process, the engine E is temporarily stopped by disabling the fuel injection device 91. If the answer to any of steps S10 through S13 is negative, then the IS control process is not performed, after which the processing sequence is ended.

Figure 8:
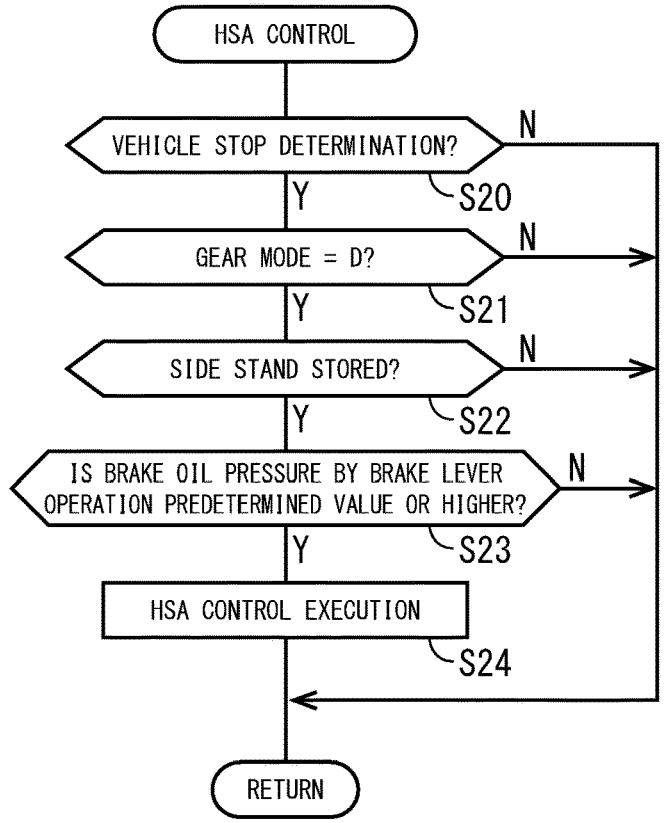
FIG. 8 is a flowchart of a processing sequence of an HSA control process.

FIG. 8 is a flowchart of a processing sequence of the HSA control process. In step S20, it is determined whether the vehicle has been determined as stopped or not. The vehicle may be determined as stopped if 1 second has elapsed after the higher one of the speeds of the front and rear wheels reached 1.8 km/h or lower, for example.

If the answer to step S20 is affirmative, then it is determined in step S21 whether a gear mode selected by the N-D selector switch 73 is the D mode or not. If the answer to step S21 is affirmative, then it is determined in step S22 whether the side stand 151 for keeping the vehicle self-standing is in the stored state or not. If the answer to step S22 is affirmative, then control goes to step S23.

In step S23, it is determined whether or not the brake oil pressure produced by operating the brake lever 13 is of a predetermined value or higher. This determining step is aimed at performing the HSA control process in a manner to reflect the will of the rider with certainty to stop the vehicle by including, as the executing condition for the HSA control process, the operation of the brake lever 13 that is liable to detect the will of the rider more accurately than the brake pedal 36 that is operated by foot. If the answer to step S23 is affirmative, then control goes to step S24, which performs the HSA control process. In the HSA control process according to the present embodiment, the brake oil pressure module 95 produces and applies a predetermined oil pressure to the rear brake caliper 31 to impose braking forces on the rear wheel brake for a predetermined time even if the brake lever 13 and the brake pedal 36 are released, so that the vehicle will not creep down even if a throttle operation is slightly delayed after the brake lever 13 and the brake pedal 36 have been released.

According to the present embodiment, the executing condition for the HSA control process is satisfied when the rider R willfully firmly grips the brake lever 13 while the conditions of steps S20 through S22 are being satisfied. However, the executing condition for the HSA control process may be satisfied when an operation of the brake lever 13 or the brake pedal 36 is detected while the conditions of steps S20 through S22 are being satisfied.

Figure 9:
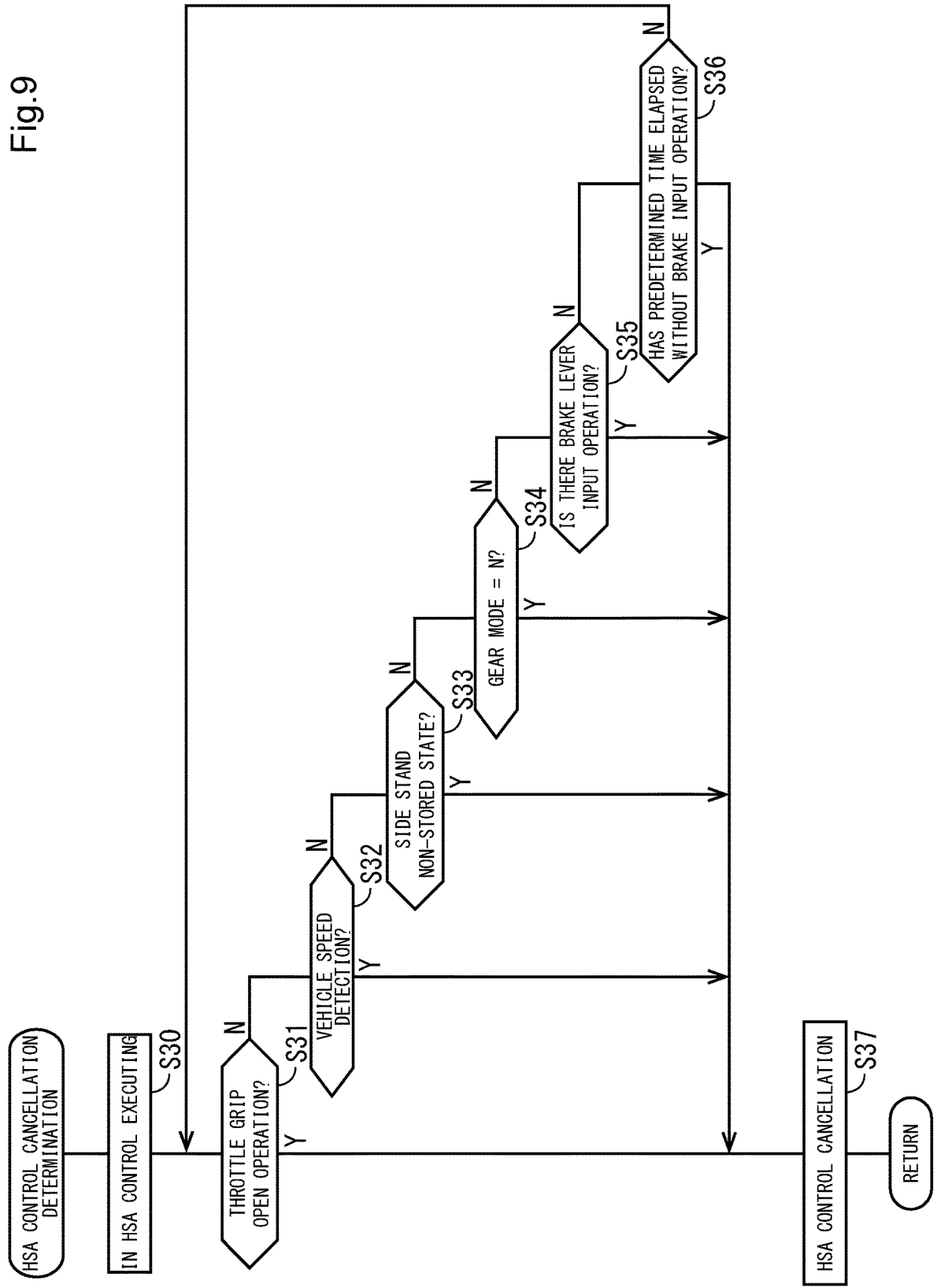
FIG. 9 is a flowchart of a processing sequence for determining whether the HSA control process is to be cancelled or not.

FIG. 9 is a flowchart of a processing sequence for determining whether the HSA control process is to be cancelled or not. As described above, the braking forces according to the HSA control process are applied until a predetermined time, e.g., 3 seconds, elapses after the brake lever 13 and the brake pedal 36 have been released. According to the present embodiment, the braking forces are gradually reduced after the predetermined time has elapsed. However, if sufficient drive forces are obtained before the predetermined time elapses, then it is preferable to reduce the braking forces quickly.

In step S30, braking forces are applied according to the HSA control process. In step S31, it is determined whether the throttle grip 5a has been operated to open the throttle valves or not. If the answer to step S31 is negative, then it is determined in step S32 whether or not the vehicle speed sensor S has detected a predetermined vehicle speed, e.g., 5 km/h, or higher. If the answer to step S32 is negative, then control goes to step S33. In step S33, it is determined whether the side stand 151 is in a non-stored state or not. If the answer to step S33 is negative, then control goes to step S34. In step S34, it is determined whether the N-D selector switch 73 has been operated to change the gear mode to the N mode or not. If the answer to step S34 is negative, then control goes to step S35. In step S35, it is determined whether the brake lever 13 has been operated to enter an input enough to perform the HSA control process. If the answer to step S35 is negative, then control goes to step S36.

In step S36, it is determined whether a predetermined time, e.g., 5 seconds, or longer has elapsed while the brake lever 13 is not being operated to enter an input or not. If the answer to step S36 is affirmative, then it is determined that the rider R is willing to start or park the vehicle or a time for permitting the HSA control process to keep braking forces has elapsed, and control goes to step S37, which cancels the HSA control process, thereby reducing the braking forces. If the answer to any of steps S31 through S35 is affirmative, then control goes to step S37, which cancels the HSA control process. If the answer to step S36 is negative, then control returns to step S31.

With the twin-clutch AMT 90 according to the present embodiment, when the vehicle starts in the D mode, a first gear position is selected and the first clutch CL1 that corresponds to the first gear position is automatically controlled in a partially engaged state and functions as a starting clutch. Therefore, the AMT 90 makes it possible for the vehicle to start with only a throttle operation. The flowchart is based on the premise of the basic control of the AMT 90, and conditions for cancelling the HSA control process in response to a vehicle staring operation may be set to include an engine rotational speed, a vehicle speed, and so on. Conditions for cancelling the HSA control process in response to an operation other than a vehicle staring operation may be set to include switching from the D mode to the N mode in response to an operation of the N-D selector switch 73, unfolding of the side stand 151, turning-off of the ignition switch, and so on.

Figure 10:
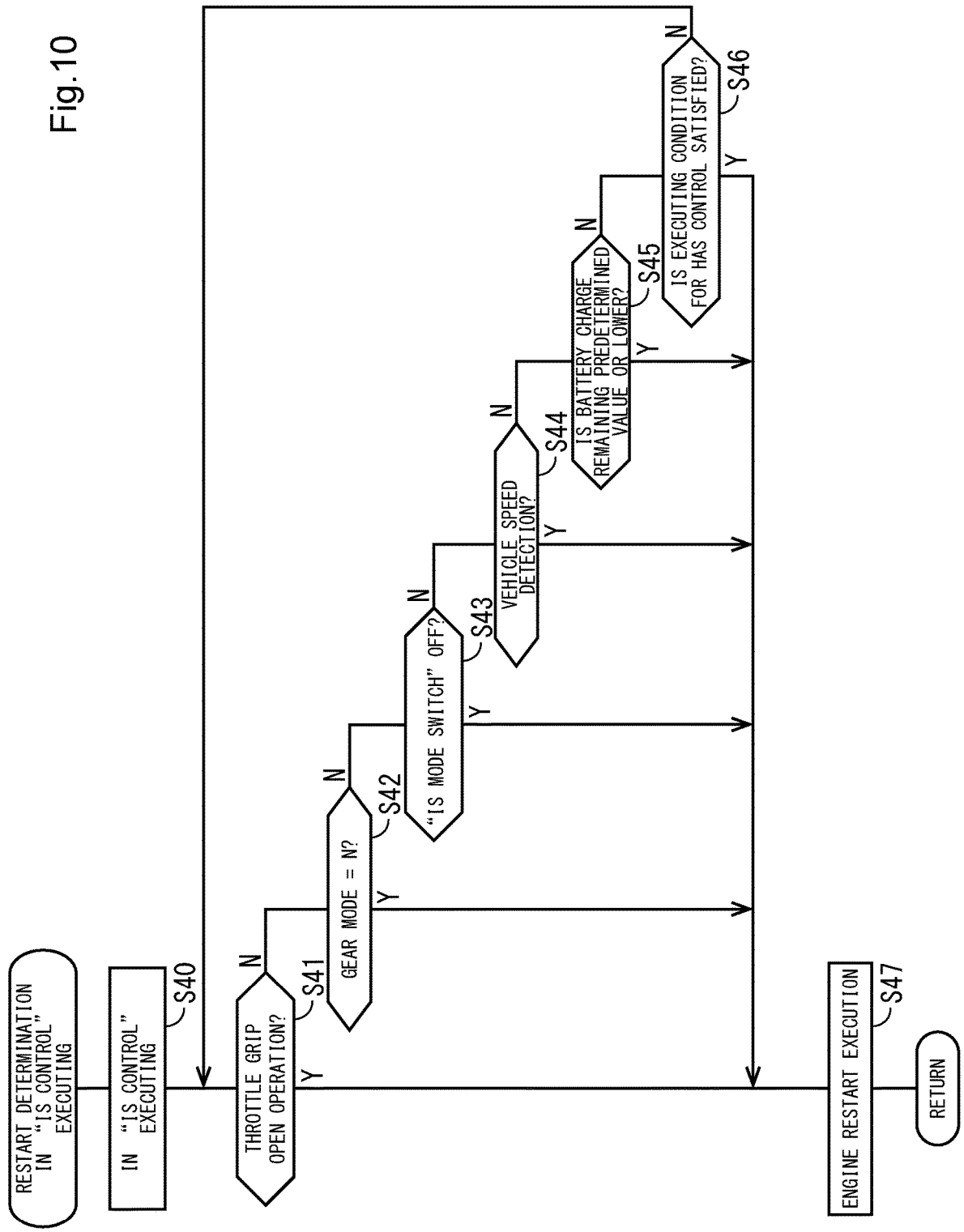
FIG. 10 is a flowchart of a processing sequence for determining whether to restart the engine while in the IS control process.

FIG. 10 is a flowchart of a processing sequence for determining whether to restart the engine E while in the IS control process. Here, conditions for restarting the engine E that has been temporarily stopped according to the IS control process are described. The flowchart illustrates six restarting conditions. If either one of the restarting conditions is satisfied, then the ACG starter motor 40 is supplied with electric power to restart the engine E.

In step S40, the engine E is temporarily stopped according to the IS control process. In step S41, it is determined whether the throttle grip 5a has been operated to open the throttle valves or not. If the answer to step S41 is negative, then control goes to step S42. In step S42, it is determined whether the N-D selector switch 73 has been operated to change the gear mode to the N mode or not. If the answer to step S42 is negative, then control goes to step S43. In step S43, it is determined whether the IS mode selector switch/starter switch 76 has been turned off or not, i.e., whether a non-execution mode for the IS control process is selected or not. If the answer to step S43 is negative, then control goes to step S44. In step S44, it is determined whether or not the vehicle speed sensor S has detected a predetermined vehicle speed, e.g., 5 km/h, or higher. If the answer to step S44 is negative, then control goes to step S45. In step S45, it is determined whether or not the battery charge of the battery 58 is of a predetermined value or lower. If the answer to step S45 is negative, then control goes to step S46. In step S46, it is determined whether the executing condition for the HSA control process has been satisfied or not. If the answer to step S46 is negative, then control returns to step S41. If the answer to any of steps S41 through S46 is affirmative, then control goes to step S47, which restarts the engine E.

The determining processes of steps S41 through S46 correspond to the respective restarting conditions set for restarting the engine E. According to the present embodiment, the restarting conditions in steps S41 through S45 are referred to as ordinary restarting conditions, whereas the restarting condition in step S46 that determines whether the executing condition for the HSA control process has been satisfied or not is referred to as a particular restarting condition, which is distinguished from the ordinary restarting conditions. The present embodiment is characterized in that the time spent after the ordinary restarting conditions are satisfied until the ACG starter motor 40 is energized and the time spent after the particular restarting condition is satisfied until the ACG starter motor 40 is energized are different from each other.

With respect to the determining process of step S43, on vehicles that are free of the IS mode selector switch/starter switch 76, the determining process of step S43 may be skipped, and control may go to step S44.

If the answer to step S45 is affirmative, then the engine E is restarted to prevent the battery from running out of the stored electric energy in advance, as the starting of the engine is prioritized in a case where the battery charge is low.

With respect to the determining processes of steps S41 and S46, the throttle grip 5a that is operated to satisfy the ordinary restarting condition in step S41 and the brake lever 13 that is operated to satisfy the particular restarting condition in step S46 are operated by the same right hand. Accordingly, a plurality of operations for restarting the engine E are handled together by one hand, resulting in a reduction in the complexities of the operation sequences.

When the engine E is restarted according to the IS control process, the controller 150 disengages the twin clutch TCL of the AMT 90, switching to a non-power transmitting state. Therefore, when the engine E is restarted at the start of the hill start assist control process, it is possible to avoid having the transmission stay in a gear meshing state, thus preventing the vehicle from wobbling forwardly and rearwardly at the time the engine is cranked. Furthermore, when the engine E is restarted according to the IS control process, the controller 150 may put the transmission in the neutral gear position with the clutch kept connected, switching to a non-power transmitting state, rather than disengaging the clutch while the transmission is in a gear meshing state.

Figure 11:
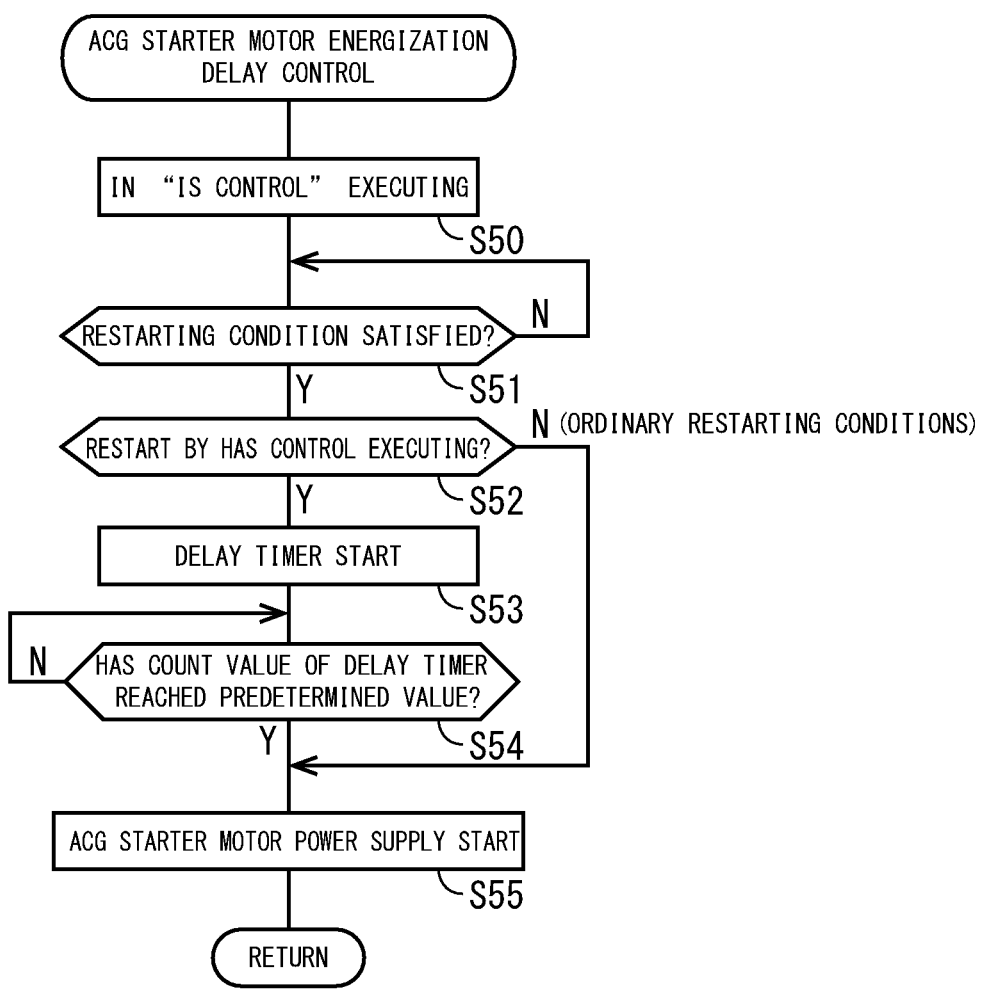
FIG. 11 is a flowchart of a processing sequence of an energization delay control process for an alternating-current generator starter motor.

FIG. 11 is a flowchart of a processing sequence of an energization delay control process for the ACG starter motor. According to the present embodiment, the time spent after the particular restarting condition is satisfied until the ACG starter motor 40 is energized is set to be longer than the time spent after the ordinary restarting conditions are satisfied until the ACG starter motor 40 is energized. The difference between these times may be set to a value ranging from 100 to 200 ms, for example.

In step S50, the engine is temporarily stopped according to the IS control process. In step S51, it is determined whether the restarting conditions are satisfied or not. If the answer to step S51 is affirmative, then control goes to step S52. In step S52, it is determined whether the engine E is to be restarted according to the HSA control process or not, i.e., whether the engine E is to be restarted because the particular restarting condition is satisfied or not.

If the answer to step S52 is affirmative, then control goes to step S53, in which the delay timer 112 starts counting time. In step S54, it is determined whether the count value of the delay timer 112 has reached a predetermined value, e.g., 100 ms, or not. If the answer to step S54 is affirmative, then control goes to step S55, in which the ACG starter motor 40 is supplied with electric power to restart the engine E.

If the answers to steps S51 and S54 are negative, then control goes back to steps S51 and S54, respectively. If the answer to step S52 is negative, i.e., if the ordinary restarting conditions are satisfied, then control goes to step S55, skipping steps S53 and S54. According to the flowchart illustrated in FIG. 11, if the ordinary restarting conditions are satisfied, then the ACG starter motor 40 is immediately energized. However, in view of communication delays between the devices, energization timings may be delayed such that if the ordinary restarting conditions are satisfied, then the ACG starter motor 40 is energized upon elapse of a predetermined time, e.g., 150 ms, and if the particular restarting condition is satisfied, then the ACG starter motor 40 is energized upon elapse of a second predetermined time, e.g., 250 ms, that is longer than the predetermined time.

FIG. 12 is a timing chart illustrating the transition of a battery voltage at the time the engine E is restarted. The timing chart indicates, successively from above, a battery voltage (V), a current (A) consumed by the brake oil pressure module, and a current (A) consumed by the ACG starter motor. Electric power consumed by the brake oil pressure module 95 has a peak A1, e.g., 50 A, that is smaller than a peak A2, e.g., 350 A, of electric power consumed by the ACG starter motor 40. However, the peak A1 is overwhelmingly large compared to electric power loads such as switches, sensors, and so on. It is desirable to avoid the co-occurrence of both of the peaks.

According to the present embodiment, when the restarting condition according to the HSA control process is satisfied, the timing to energize the ACG starter motor 40 is delayed to shift the peak of electric power consumed, thereby reducing the possibility that the electric power loads such as the audio device, the navigation device, and so on will undergo system resetting.

According to the timing chart, the ACG starter motor 40 starts to be energized at time t3 upon elapse of a second predetermined time T2, e.g., 250 ms, after the executing condition for the HSA control process is satisfied at time t1. The energization timing is later by a time T3, e.g., 100 ms, than if the ACG starter motor 40 is energized at time t2 upon elapse of a predetermined time T1, e.g., 150 ms, after the ordinary restarting conditions are satisfied at time t1. The possibility that the peak A1 of electric power consumed by the brake oil pressure module 95 and the peak A2 of electric power consumed by the ACG starter motor 40 will co-occur is thus eliminated, resulting in an increase in system resetting resistance.

With the engine start control device according to the present embodiment, as described above, the engine E is restarted if the executing condition for the HSA control process is satisfied while the engine E is being temporarily stopped according to the IS control process. Therefore, the ACG starter motor 40 starts generating electric power, making it possible to avoid a shortage of electric power supplied to the brake oil pressure module 95 required for the HSA control process and other electric power loads including the audio device, the navigation device, and so on. In addition, inasmuch as the second predetermined time T2 after the particular restarting condition is satisfied until the ECU 150 energizes the ACG starter motor 40 is longer than the predetermined time T1 after the ordinary restarting conditions are satisfied until the ECU 150 energizes the ACG starter motor 40, the co-occurrence of the peak of electric power consumed by the brake oil pressure module 95 and the peak of electric power consumed by the ACG starter motor 40 at the time the HSA control process is started is avoided. A shortage of electric power supplied to other electric power loads is avoided, and system resetting resistance is increased.

Other systems that consume electric power include heaters such as a seat heater, a grip heater, and so on. Furthermore, while the engine is being stopped according to the IS control process, a control process for de-energizing an electric motor for a cooling system, e.g., a fan motor or the like, is also effective to reduce the consumption of electric power stored in the battery.

The structures of the engine and the transmission, the structures of and electric power consumed by the ACG starter motor and the brake oil pressure module, the structures of the other electric power loads such as the audio device, the navigation device, and so on, and the settings of the ordinary restarting conditions and the particular restarting condition are not limited to those illustrated in the above embodiment, but may be changed or modified in various manners. For example, a predetermined hill-climb angle, e.g., 3 degrees, or higher detected by the hill-climb angle sensor, or an intentional input to a rear brake pedal may be used as an executing condition for the HSA control process. The HSA control process may keep brake oil pressures on the front and rear brakes. The engine start control device according to the present embodiment is applicable to not only motorcycles, but also saddle-type three- or four-wheeled vehicles.

1 . . . Motorcycle (vehicle), 5a . . . Throttle grip, 13 . . . Brake lever (Brake operating member), 34 . . . Front wheel rotational speed sensor, 35 . . . Rear wheel rotational speed sensor, 36 . . . Brake pedal (Brake operating member), 40 . . . ACG starter motor, 58 . . . Battery, 94 . . . Brake oil pressure sensor, 95 . . . Brake oil pressure module, 110 . . . Idling stop controller, 111 . . . Restarting delay controller, 112 . . . Delay timer, 120 . . . Hill start assist controller, 150 . . . ECU (Controller), S . . . Vehicle speed sensor, E . . . Engine, T1 . . . Predetermined time, T2 . . . Second predetermined time

The invention claimed is:

1. An engine start control device applicable to a vehicle, comprising:
an alternating-current generator starter motor for applying a starting torque to an engine when supplied with electric power from a battery and generating electric power based on rotational power from the engine; and
a controller for carrying out an idling stop control process and a hill start assist control process,
wherein the idling stop control process is a control process for temporarily stopping the engine if a stopping condition is satisfied and restarting the engine if restarting conditions are satisfied,
wherein the hill start assist control process is a control process for keeping braking forces for a predetermined time, even if a brake operating member is released while the vehicle is being stopped on an uphill slope,
wherein the controller restarts the engine if an executing condition for the hill start assist control process is satisfied while the engine is being temporarily stopped according to the idling stop control process,
wherein the braking forces according to the hill start assist control process are kept by a brake oil pressure module that is energized when supplied with electric power,
wherein the restarting conditions for the idling stop control process include a plurality of ordinary restarting conditions and a particular restarting condition by way of the executing condition for the hill start assist control process that is to be satisfied while the engine is being temporarily stopped according to the idling stop control process, and
wherein the controller makes a second predetermined time after the particular restarting condition is satisfied until the controller starts to energize the alternating-current generator starter motor longer than a predetermined time after the ordinary restarting conditions are satisfied until the controller starts to energize the alternating-current generator starter motor.

2. The engine start control device according to claim 1, wherein the ordinary restarting conditions include a condition in which a battery charge of the battery is smaller than a predetermined value.

3. The engine start control device according to claim 1, wherein the brake operating member includes a brake lever mounted on a grip-type steering handle, and
wherein the executing condition for the hill start assist control process includes a condition in which the brake lever is operated to generate the brake oil pressure.

4. The engine start control device according to claim 3, wherein the vehicle has a throttle grip mounted on the steering handle on the brake lever side and a throttle grip opening sensor for detecting an operated opening of the throttle grip, and
wherein the ordinary restarting conditions include a condition in which an opening operation of the throttle grip is detected by the throttle grip opening sensor.

5. The engine start control device according to claim 1, wherein the engine has an automatic transmission, and
wherein the controller controls the automatic transmission to switch to a non-power transmitting state when restarting the engine.

6. The engine start control device according to claim 1, wherein the vehicle includes an electric power load using the battery as an electric power supply source.

7. The engine start control device according to claim 2, wherein the brake operating member includes a brake lever mounted on a grip-type steering handle, and
wherein the executing condition for the hill start assist control process includes a condition in which the brake lever is operated to generate the brake oil pressure.

8. The engine start control device according to claim 7, wherein the vehicle has a throttle grip mounted on the steering handle on the brake lever side and a throttle grip opening sensor for detecting an operated opening of the throttle grip, and
wherein the ordinary restarting conditions include a condition in which an opening operation of the throttle grip is detected by the throttle grip opening sensor.

9. The engine start control device according to claim 2, wherein the engine has an automatic transmission, and
wherein the controller controls the automatic transmission to switch to a non-power transmitting state when restarting the engine.

10. The engine start control device according to claim 3, wherein the engine has an automatic transmission, and
wherein the controller controls the automatic transmission to switch to a non-power transmitting state when restarting the engine.

11. The engine start control device according to claim 4, wherein the engine has an automatic transmission, and
wherein the controller controls the automatic transmission to switch to a non-power transmitting state when restarting the engine.

12. The engine start control device according to claim 2, wherein the vehicle includes an electric power load using the battery as an electric power supply source.

13. The engine start control device according to claim 3, wherein the vehicle includes an electric power load using the battery as an electric power supply source.

14. The engine start control device according to claim 4, wherein the vehicle includes an electric power load using the battery as an electric power supply source.

15. The engine start control device according to claim 5, wherein the vehicle includes an electric power load using the battery as an electric power supply source.

* * * * *